United States Patent [19]

Tada et al.

[11] Patent Number: 4,815,324

[45] Date of Patent: Mar. 28, 1989

[54] INTAKE AIR METER FOR AN INTERNAL COMBUSTION ENGINE

[75] Inventors: Yasuo Tada; Minoru Abe, both of Himeji, Japan

[73] Assignee: Mitsubishi Denki Kabushiki Kaisha, Japan

[21] Appl. No.: 38,607

[22] Filed: Apr. 15, 1987

[30] Foreign Application Priority Data

Apr. 24, 1986 [JP] Japan .............................. 61-62115[U]
Apr. 24, 1986 [JP] Japan .............................. 61-62116[U]
Apr. 24, 1986 [JP] Japan .............................. 61-62117[U]
Apr. 24, 1986 [JP] Japan .............................. 61-62118[U]

[51] Int. Cl.⁴ .............................................. G01F 1/32
[52] U.S. Cl. .............................. 73/861.22; 73/861.23
[58] Field of Search ........... 73/861.22, 861.23, 861.18, 73/861.27, 861.28, 861.29, 861.31, 861.24, 861.06, 118.2

[56] References Cited

U.S. PATENT DOCUMENTS

| 3,818,877 | 6/1974 | Barrera et al. ................ 123/32 EA |
| 3,965,730 | 6/1976 | Innes ................................. 73/118 |
| 4,452,089 | 5/1984 | Wada ............................... 73/861.23 |
| 4,555,937 | 12/1985 | Sumal .............................. 73/118 |

FOREIGN PATENT DOCUMENTS

57-25141 5/1982 Japan .
58-56415 12/1983 Japan .
59-17373 4/1984 Japan .

OTHER PUBLICATIONS

Joy, Robert D., "Airflow Measurement for Engine Control", Feb. 23, 1976, p. 5.

*Primary Examiner*—Stewart J. Levy
*Assistant Examiner*—Robert P. Bell
*Attorney, Agent, or Firm*—Leydig, Voit & Mayer

[57] ABSTRACT

An intake air meter for measuring the intake air of an internal combustion engine operates on the principle of an ultrasonic Karman vortex flowmeter. A Karman vortex shedder is disposed in the main intake air passageway of an engine. Ultrasonic waves which are generated by an ultrasonic transmitter are phase modulated by the Karman vortex street which is shed by the vortex shedder. An ultrasonic receiver receives the ultrasonic waves and produces a phase modulated output signal, which is demodulated using a phase locked loop and a low-pass filter. The output of the low-pass filter can be used to count the rate of which Karman vortices are generated by the vortex shedder. A pressure-dependent component in the output signal from the low-pass filter which is caused by pressure variations within the main intake air passageway is removed by compensating means comprising a pressure sensor which measures the air pressure in the vicinity of the vortex shedder, an amplifier which amplifies the AC component of the output of the pressure sensor to equal the amplitude of the pressure-dependent component, an inverter which inverts the amplified output, and a waveform shaper which sums the inverted output and the output from the low-pass filter.

5 Claims, 7 Drawing Sheets

INTAKE AIR METER FOR AN INTERNAL COMBUSTION ENGINE

BACKGROUND OF THE INVENTION

This invention relates to an air intake meter which operates on the principles of a Karman vortex flowmeter for measuring the amount of intake air of an internal combustion engine. More particularly but not exclusively, it relates to an intake air meter for an internal combustion engine of an automobile having a circuit for compensating for fluctuations in the pressure in the main intake air passageway due to the pulsing action of individual cylinders.

A fuel injection system for an internal combustion engine requires constant monitoring of the amount of intake air. A Karman vortex flowmeter is particularly suitable for measuring the intake air of an internal combustion engine of an automobile because it has no moving parts and therefore has good vibration resistance.

Figure 1:
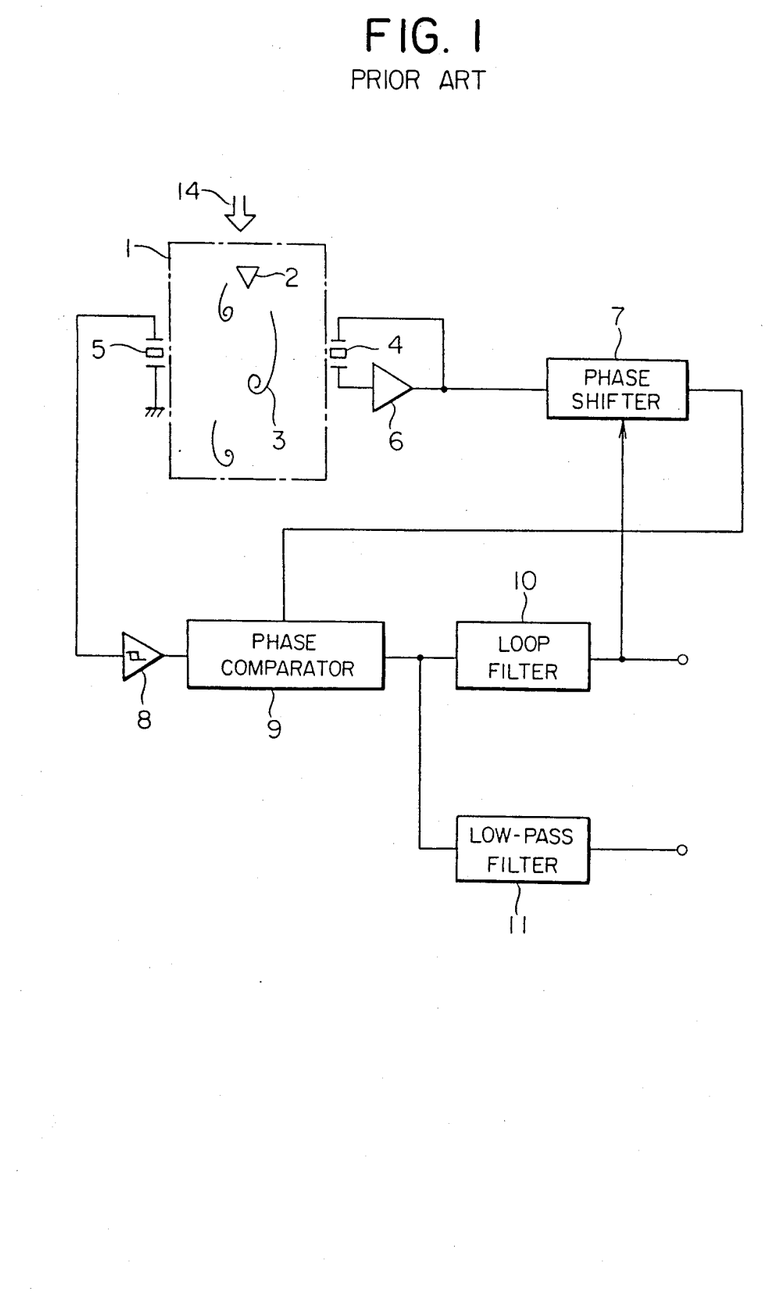
FIG. 1 is a block diagram of a conventional intake air meter for an internal combustion engine.

FIG. 1 is a block diagram of a conventional intake air meter employing a Karman vortex flowmeter which was disclosed in Japanese Patent Publication No. 58-56415. This intake air meter has a Karman vortex flowmeter 1 comprising a vortex shedder 2 including an obstruction which is disposed in the center of an unillustrated main intake air passageway of an internal combustion engine. Intake air 14 which enters the main intake air passageway flows past the vortex shedder 2, which sheds a Karman vortex street 3. An ultrasonic transmitter 4 and an ultrasonic receiver 5, which confronts the ultrasonic transmitter 4, are disposed on opposite sides of the main intake air passageway downstream of the vortex shedder 2. The ultrasonic transmitter 4 is driven by an oscillator circuit 6, and generates ultrasonic waves which propagate across the main intake air passageway and are received by the ultrasonic receiver 5. In crossing the main intake air passageway, the ultrasonic waves are phase modulated by the Karman vortex street 3. The output of the ultrasonic receiver 5 is input to a first waveform shaping circuit 8 which amplifies and shapes it and inputs it as a first input signal to a phase comparator 9. The output of the oscillator circuit 6 is input to a voltage-controlled phase shifter 7 which produces an output signal whose phase is shifted from that of the output from the oscillator circuit 6 by an amount which is controlled by the voltage of the output from a loop filter 10. The output from the voltage-controlled phase shifter 7 is input as a second input signal to the phase comparator 9, which produces an output corresponding to the phase difference between the two input signals. This output is input to the loop filter 10, which removes unwanted frequency components from the output of the phase comparator 9. The voltage-controlled phase shifter 7, the phase comparator 9, and the loop filter 10 thus form a phase locked loop. The output of the phase comparator 9 is also input to a low-pass filter 11 which removes the carrier frequency component from the output of the phase comparator 9.

The voltage-controlled phase shifter 7 maintains the high-frequency stability of the output signal from the oscillator circuit 6 while controlling only its phase shift. The characteristics of the loop filter 10 in the phase locked loop are chosen to have adequate speed to follow the modulation angular frequency of the signal which is phase modulated by the Karman vortex street 3. The output of the loop filter 10, which is used as a phase demodulated output, varies so as to make the output of the voltage-controlled phase shifter 7 synchronous with the output from the ultrasonic receiver 5. The phase synchronization angle of the phase locked loop is determined by the characteristics of the phase comparator 9 and the loop filter 10. By using a recently-developed phase comparator integrated circuit, phase synchronization angles of 0, $\pi/2$, $\pi$, etc. can be easily attained.

Figure 2:
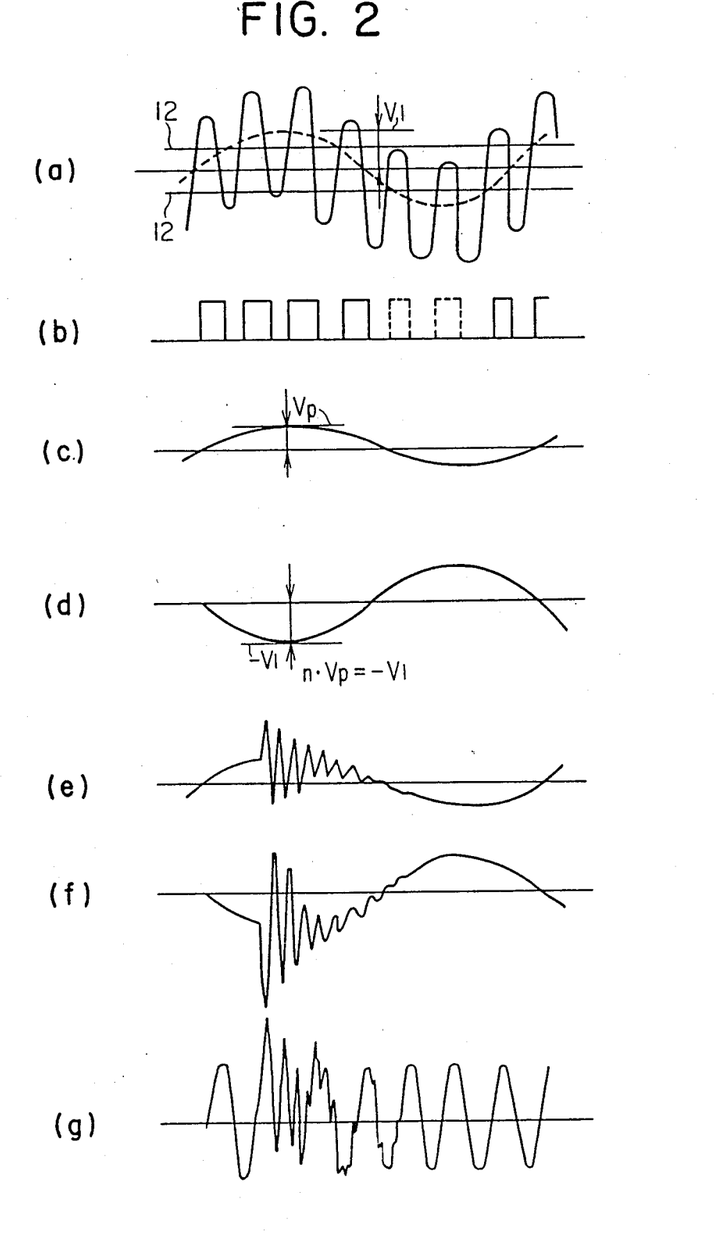
FIG. 2 is waveform diagram showing the electrical outputs of various portions of the conventional meter of FIG. 1 and of an intake air meter according to the present invention.

Due to the overlapping of the operation of the intake valves of an internal combustion engine, particularly in a multicylinder engine, the flow of intake air fluctuates periodically. At the instant when an unillustrated intake valve opens, the pressure within the intake manifold suddenly decreases. When the throttle valve of the engine (not illustrated) is nearly completely open, the sudden drop in pressure is transmitted past the throttle valve to the main intake air passageway in which the vortex shedder 2 is located. Therefore, the pressure within the main air intake passageway fluctuates, causing the Karman vortex street 3 to be generated in an irregular manner. As a result, the output signal of the low-pass filter 11, shown by the solid line in FIG. 2a, contains a time-varying, pressure-dependent component, indicated by the dashed line in the same figure, and the average amplitude of the output of the low-pass filter 11 fluctuates along with the pressure-dependent component. The output from the low-pass filter 11 is normally shaped to produce square waves based on the time the output crosses two inversion levels 12. The resulting shaped output is shown in FIG. 2b. Ideally, each peak in the output of the low-pass filter 11 should correspond to one square wave in the shaped output of FIG. 2b, but due to the pressure-dependent component, the output of the low-pass filter 11 does not always cross the inversion levels 12, and a portion of the desired waveform is missing, as shown by the dashed lines in FIG. 2b. Because of the missing square waves, the number of Karman vortices generated can not be correctly counted and the intake air rate cannot be accurately measured.

SUMMARY OF THE INVENTION

It is an object of the present invention to provide an intake air meter for an internal combustion engine which is not influenced by pressure variations in the main intake air passageway of the engine.

An intake air meter for an internal combustion engine in accordance with the present invention operates on the principle of a Karman vortex flowmeter. A Karman vortex shedder is disposed in the main intake air passageway of the engine. Ultrasonic waves generated by an ultrasonic transmitter are phase modulated by the Karman vortex street shed by the vortex shedder. An ultrasonic receiver receives the ultrasonic waves and produces a phase modulated output signal which is demodulated using a phase locked loop and a low-pass filter. The output of the low-pass filter is used to count the rate at which Karman vortices are generated by the vortex shedder. The pressure-dependent component of the output signal from the low-pass filter, caused by pressure variations within the main intake air passageway, is removed by a compensating means.

The compensating means comprises a pressure sensor which measures the air pressure in the vicinity of the vortex shedder and produces a corresponding output, an amplifier which amplifies the AC component of the output from the pressure sensor so that it will have the same amplitude as the pressure-dependent component of the output of the low-pass filter, an inverter which inverts the output of the amplifier, and a waveform shaping circuit which sums and shapes the outputs of the low-pass filter and the output of the inverter so as to produce an output which does not contain a pressure-dependent component.

The pressure sensor may be disposed so as to measure the air pressure either upstream or downstream of the vortex shedder. Furthermore, the pressure sensor can be used to measure the air pressure in either the main intake air passageway itself or in a chamber or second passageway which communicates with the main intake air passageway. In accordance with one embodiment, the pressure sensor measures the air pressure within an air chamber located off of but in communication with the main intake air passageway. In accordance with another embodiment, the pressure sensor measures the air pressure within a second air passageway disposed upstream along the same flow path as the main intake air passageway. The second intake air passageway may comprise an air cleaner equipped with a filter.

The intake air meter may be further equipped with a filter which passes only the DC component of the output of the pressure sensor. This DC component is proportional to the average pressure within the main intake air passageway and can be used to convert the volume flow rate as measured by the intake air meter into a mass flow rate.

BRIEF DESCRIPTION OF THE DRAWINGS

In the drawings, the same reference numerals indicate the same or corresponding parts.

DESCRIPTION OF THE PREFERRED EMBODIMENTS

Figure 3:
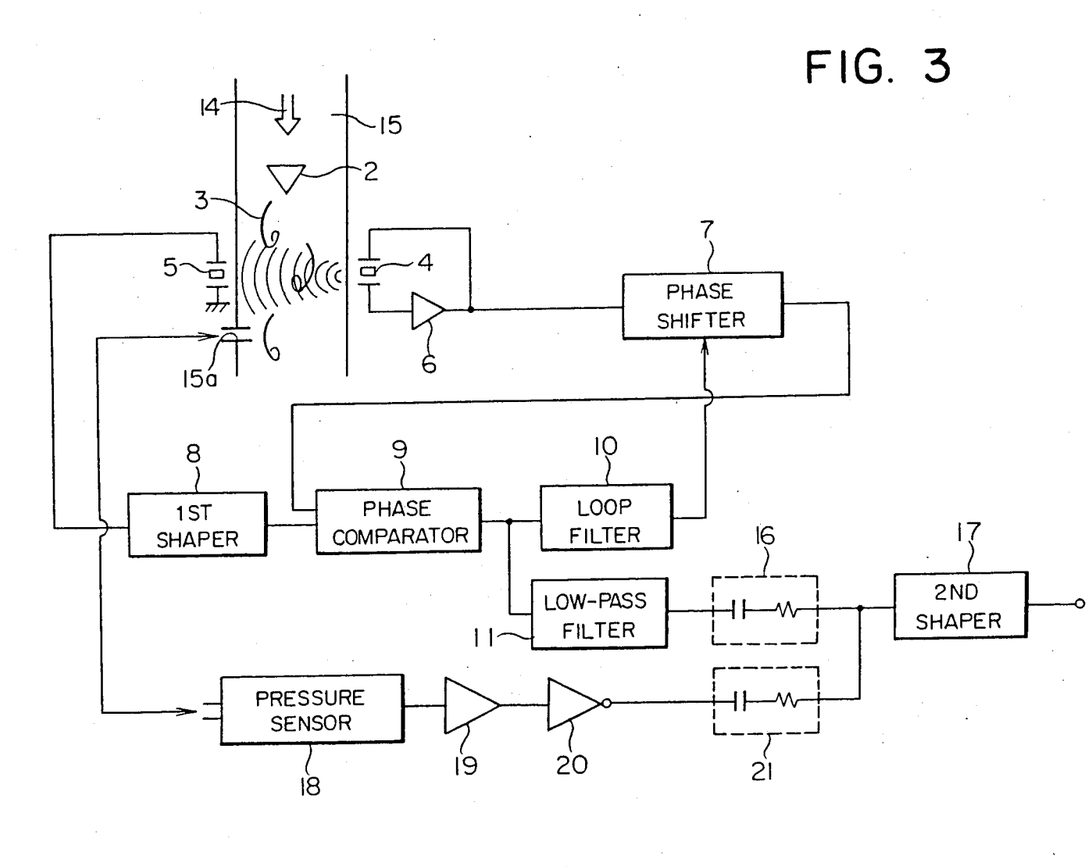
FIG. 3 is a block diagram of a first embodiment of an intake air meter in accordance with the present invention.

Preferred embodiments of an intake air meter in accordance with the present invention will now be described with reference to the accompanying drawings. FIG. 3 illustrates a first embodiment. Like the intake air meter of FIG. 1, this embodiment has a vortex shedder 2 which is disposed in the center of the main intake air passageway 15 of an internal combustion engine through which intake air 14 enters. Elements numbers 2–11 are the same as the corresponding elements in FIG. 1 and function in the same manner. Downstream of the ultrasonic transmitter 4 and the ultrasonic receiver 5, an opening 15a is formed in the wall of the main intake air passageway 15 to enable the air pressure within the main intake air passageway 15 to be transmitted to a pressure sensor 18, which produces an output signal corresponding to the pressure. The AC component of the output signal from the pressure sensor 18 is amplified by an amplifier 19 which is connected to the output side of the pressure sensor 18. The output of the amplifier 19 is then inverted by an inverter 20 which is connected to the output side of the amplifier 19. The output signals from the low-pass filter 11 and the inverter 20 are smoothed by a first series RC circuit 16 and a second series RC circuit 21, respectively. The smoothed outputs from the RC circuits 16 and 21 are input to a second waveform shaper 17. The second waveform shaper 17 adds the two input signals and then shapes the resulting summed waveform. The pressure sensor 18, the amplifier 19, the inverter 20, the RC circuits 16 and 21, and the second waveform shaper 17 together constitute compensating means for removing the pressure-dependent component from the output of the low-pass filter 11.

As shown in FIG. 2a, the time-varying, pressure-dependent component of the output signal from the low-pass filter 11 has an amplitude of V1. As shown in FIG. 2c, the output signal from the pressure sensor 18 has an amplitude of Vp and the same time-dependency as the pressure-dependent component in FIG. 2a. Therefore, by suitably amplifying the AC component of the output of the pressure sensor 18 by $n = V1/Vp$, for example, the amplitude (n)(Vp) of the output of the amplifier 19 can be made identical to the amplitude V1 of the pressure-dependent component of the output signal from the low-pass filter 11. The output of the inverter 20, shown in FIG. 2d, is the exact inverse of the pressure-dependent component. Therefore, when the outputs of the low-pass filter 11 and the inverter 20 are summed by the second waveform shaping circuit 17, the pressure-dependent component is subtracted out of the output signal from the low-pass filter 11. As a result, a square wave output which has no missing portions and which corresponds to the actual number of Karman vortices which are generated in the main air intake passageway 15 can be obtained, and the air intake into the engine can be accurately determined therefrom.

In this first embodiment, the pressure within the main air intake passageway 15 is measured downstream of the vortex shedder 2, but it may be masured upstream with the same effects.

FIG. 2c illustrates the case in which the output of the pressure sensor 18 is a smooth curve, but depending on the conditions within the main air intake passageway 15 downstream of the vortex shedder 2, the pressure variation in the main intake air passageway 15 may contain a high-frequency component, in which case the output of the amplifier 19 will appear as shown in FIG. 2e. This high-frequency component is filtered out by the low-frequency pressure following ability of the ultrasonic transmitter 4 and the ultrasonic receiver 5, and the output of the low-pass filter 11 is unaffected thereby. However, this component is not removed from the output of the amplifier 19. Accordingly, the output of the inverter 20 will also contain a high-frequency component as shown in FIG. 2f, and the sum of the waveforms shown in FIG. 2a and FIG. 2f will appear as shown in FIG. 2g. Using such an output, it is impossible to accurately determine the number of Karman vortices which are generated.

Figure 4:
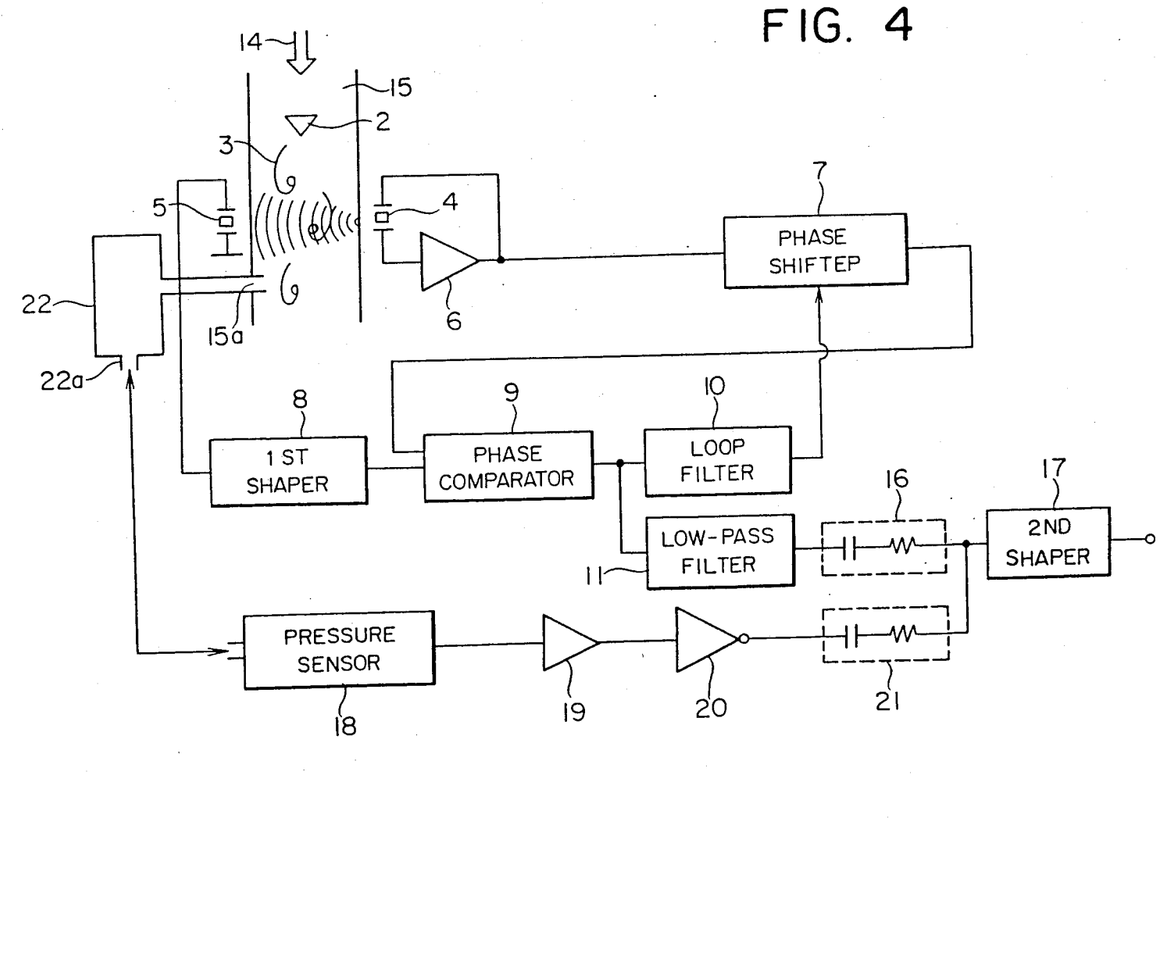
FIG. 4 is a block diagram of a second embodiment of the present invention.

This problem is solved in a second embodiment of the present invention in which, as shown in FIG. 4, the pressure variations within the main intake air passsageway 15 are measured in an air chamber 22 which communicates with the main intake air passageway 15. The dimensions of the air chamber 22 are selected such that the high-frequency fluid impedance thereof is greater than that of the main air intake passageway 15. The air chamber 22 communicates with the inside of the main air intake passageway 15 through the above-described opening 15a. The air chamber 22 has an opening 22a formed in one of its walls through which the pressure variations within the air chamber 22 can be transmitted to a pressure sensor 18. The structure of this embodiment is otherwise identical to that of the previous embodiment.

Pressure variations within the main intake air passageway 15 are transmitted through opening 15a into the air chamber 22 and from the air chamber 22 to the pressure sensor 18 via opening 22a. As the air chamber 22 has a large cross-sectional area, the high-frequency fluid impedance thereof is greater than that of the main intake air passageway 15, and the high-frequency component of the pressure variation is attenuated. Accordingly, the pressure sensor 18 produces a smooth output containing only a low-frequency component. The output signals of the amplifier 19 and the inverter 20 are smooth curves like those shown in FIGS. 2c and 2d, respectively, and therefore, by summing the outputs of the low-pass filter 11 and the inverter 20, the pressure-dependent component is subtracted from the output signal from the low-pass filter 11. As a result, the number of Karman vortices which are generated can be accurately counted using this curve.

In the embodiment of FIG. 4, the air chamber 22 opens onto the main air intake passageway 15 downstream of the vortex shedder 2, but it is possible for it to open onto the main intake air passageway 15 on the upstream side of the vortex shedder 2 with the same results.

Figure 5:
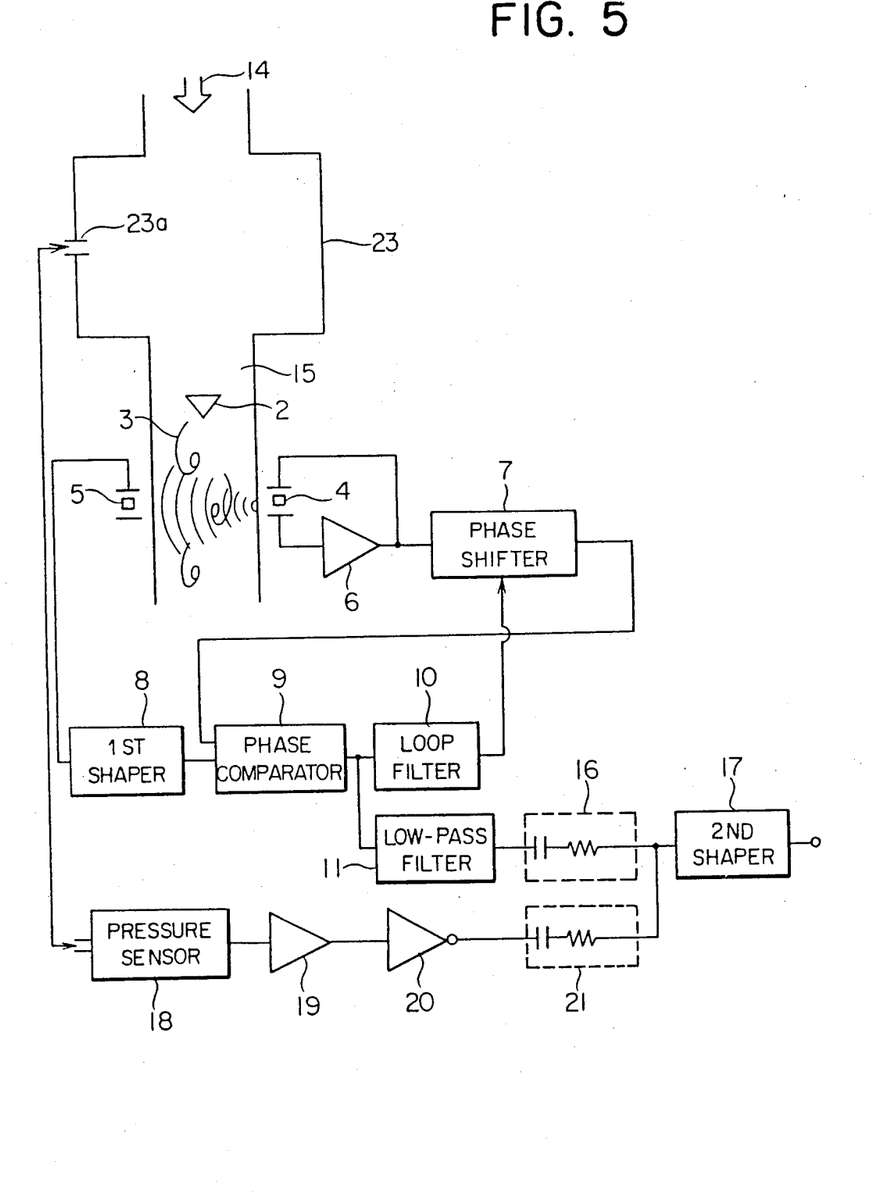
FIG. 5 is a block diagram of a third embodiment of the present invention.

FIG. 5 illustrates of the present invention in which pressure variations in the intake air 14 entering an internal combustion engine are measured in a second intake air passageway 23 which is located upstream of the main intake air passageway 15 and whose flow area, i.e., whose transverse cross-sectional area is larger than that of the main intake air passageway 15. In the vicinity of a vortex shedder 2, the second air intake passageway 23 has an opening 23a formed in one of its walls. The pressure variations within the second air intake passageway 23 are transmitted to a pressure sensor 18 through this opening 23a. Except for the absence of an opening 15a in the main intake air passageway 15, the structure of this embodiment is otherwise identical to that of the embodiment of FIG. 3.

The second intake air passageway 23 is selected to have a larger flow area than the main intake air passageway 15 so that the high-frequency fluid impedance thereof will be greater than that of the main intake air passageway 15. Accordingly, the high-frequency component of the pressure fluctuation within the second intake air passageway 23 is attenuated without influencing the characteristics of the Karman vortex street 3, which are determined by the conditions downstream of the vortex shedder 2. The output of the pressure sensor 18 is therefore a smooth curve containing no high-frequency component. Using this smooth output from the pressure sensor 18, the number of Karman vortices which are generated can be accurately determined in the same manner as in the previous embodiments.

Figure 6:
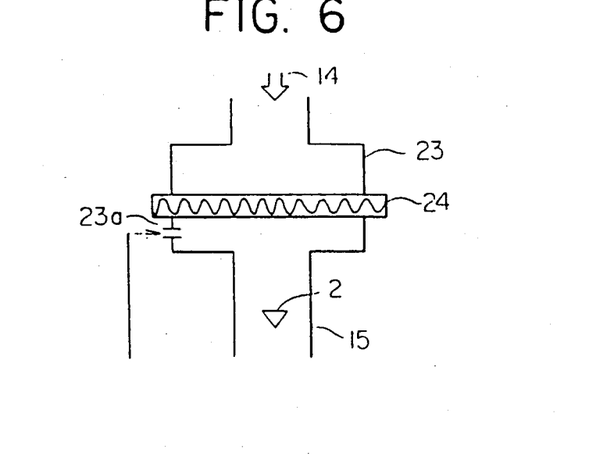
FIG. 6 is a schematic diagram of one example of a second intake air passageway for the embodiment of FIG. 5.

As shown in FIG. 6, the second intake air passageway 23 of this embodiment can be in the form of an air cleaner equipped with an air filter 24, and the opening 23a can be formed in the wall of the air cleaner. By using an air cleaner as the second intake passageway 23, the manufacturing costs of the present invention can be reduced.

Figure 7:
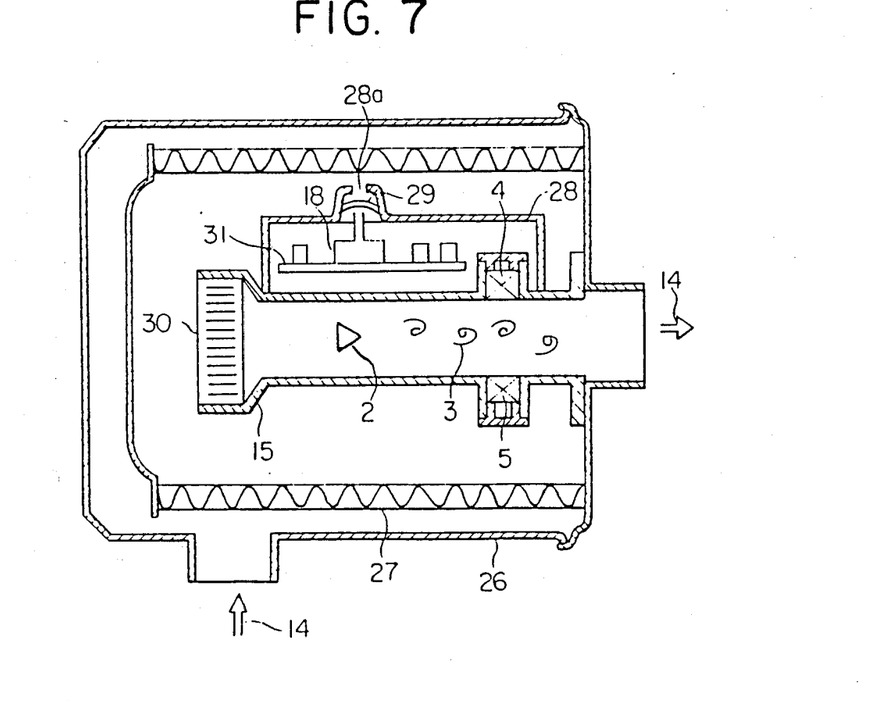
FIG. 7 is a longitudinal cross-sectional view of a mounting structure for an air meter with compensating means, the mounting structure being schematically illustrated in of FIG. 5.

Although in FIG. 5 the pressure sensor 18 is disposed on the outside of the second intake air passageway 23 and communicates with the inside thereof through an opening 23a, as long as the pressure sensor 18 is able to measure the pressure within the second intake air passageway 23, there is no restriction on where it is disposed. FIG. 7 is a cross-sectional view of a mounting structure for an air intake meter with pressure compensating means, which mounting structure is disclosed and claimed in copending Application Ser. No. 07/023,565, filed Mar. 9, 1987, entitled "Intake Air Manifold Support Structure for an Air Flow Rate Detecting Device". This structure is schematically illustrated in FIG. 5 in which the pressure sensor 18 is disposed within a second intake air passageway. In this mounting structure, a main intake air passageway 15 extends into a second air intake passageway which is in the form of an air cleaner 26. The air cleaner 26 is equipped with a hollow air filter 27 which surrounds the main intake air passageway 15. An ultrasonic transmitter 4 and an ultrasonic receiver 5 are disposed in recesses formed in opposite sides of the main intake air passageway 15. A housing 28 is secured to the outside surface of the main intake air passageway 15. The housing 28 contains a pressure sensor 18 and a control circuit 31 comprising the other of elements 6–21 of FIG. 5. The inside of the housing 28 communicates with the inside of the air cleaner 26 through an opening 28a, which corresponds to the opening 23a of FIG. 5 and enables the air pressure within the air cleaner 26 to be transmitted to the pressure sensor 18. An air filter 29 is provided across the opening 28a. A honeycomb-shaped flow straightener 30 is disposed at the intake end of the main intake air passageway 15. This example functions in the same manner as was described with respect to FIG. 5.

Figure 8:
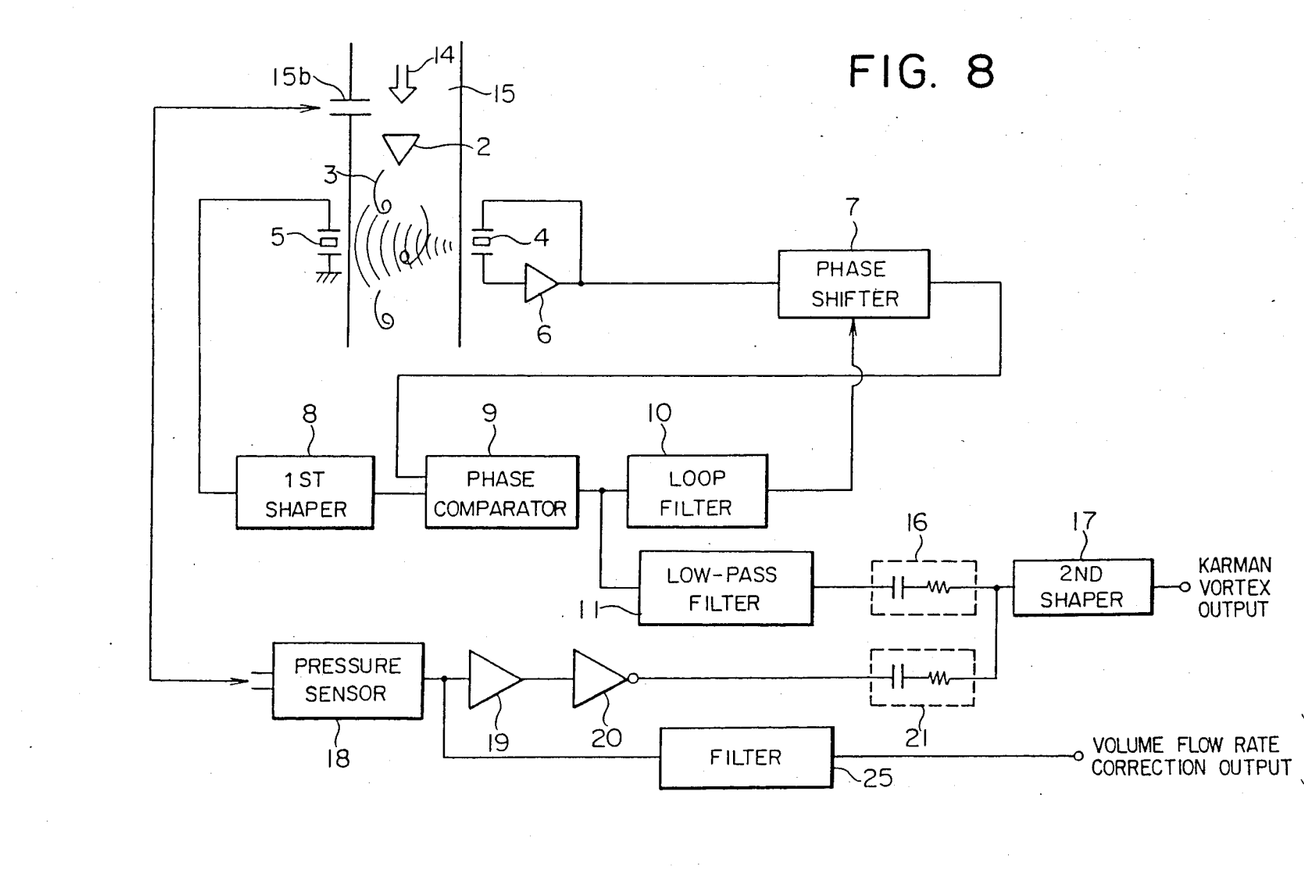
FIG. 8 is a block diagram of a fourth embodiment of the present invention.

A Karman vortex flowmeter is a volume flow rate meter, and the output signal from the second waveform shaper 17 in the preceding embodiments indicates the volume flow rate through the main intake air passageway 15. However, as the fuel-air ratio of an internal combustion engine is a mass ratio, it is necessary to convert the volume flow rate which is determined from the output of the second waveform shaper 17 into a mass flow rate. This conversion is normally carried out by a microcomputer. In order to perform the conversion, it is necessary to measure the average pressure within the main intake air passageway 15. FIG. 8 illustrates a fourth embodiment of the present invention in which the DC component of the output of a single pressure sensor 18 can be used to convert the volume flow rate, as indicated by the output from the second waveform shaper 17, into a mass flow rate. The structure of this embodiment is nearly identical to that of the embodiment of FIG. 3, except that an opening 15b through which pressure is measured by a pressure sensor 18 is formed in the wall of a main intake air passageway 15 on the upstream side and in the vicinity of a vortex shedder 2. This embodiment further comprises a filter 25 into which the output of the pressure sensor 18 is input. The output signal of the pressure sensor 18 has a DC component corresponding to the average air pressure within the main intake air passageway 15 and an AC component corresponding to the variations from this average pressure. The filter 25 removes the AC component of the output signal from the pressure sensor 18 and passes only the DC component thereof. The output signal from the filter 25 can then be used a microcomputer (not illustrated) to convert the volume flow rate, which is determined from the output of the second waveform shaper 17, into a mass flow rate. The operation of this embodiment is otherwise identical to that of the embodiment of FIG. 3.

A filter having the same function as that of filter 25 can also be connected to the output of the pressure sensor 18 of any of the preceding embodiments with the same effects.

What is claimed is:

1. An intake air meter for an internal combustion engine comprising:
    a Karman vortex shedder which is disposed in the main air intake passageway of said engine;
    ultrasonic transmitter means for generating ultrasonic waves and ultrasonic receiver means for receiving said ultrasonic waves and producing a corresponding electrical output signal, said ultrasonic transmitter means and said ultrasonic receiving means being disposed on opposite sides of said main air intake passageway downstream of said Karman vortex shedder such that a Karman vortex street which is shed by said Karman vortex shedder will pass therebetween;
    oscillator means for driving said ultrasonic transmitter so as to generate said ultrasonic waves;
    first waveform shaping means for shaping the output signal of said ultrasonic receiver;
    phase comparator means for producing an output signal corresponding to the phase difference between a first input signal which is the output signal from said first waveform shaping means and a second input signal;
    loop filter means for removing unwanted frequency components from the output signal of said phase comparator;
    voltage-controlled phase shifting means for shifting the phase of the output signal from said oscillator means in accordance with the voltage of the output signal from said loop filter means and providing a phase-shifted output as said second input signal to said phase comparator means;
    low-pass filter means for removing a carrier frequency component from the output signal of said phase comparator means;
    compensating means for removing a pressure-dependent component from the output signal of said low-pass filter means, said pressure-dependent component being dependent on the air pressure fluctuations within said main intake air passageway, said compensating means comprising:
        pressure sensor means for measuring the air pressure in the vicinity of said Karman vortex shedder and producing a corresponding output signal,
        amplifier means for amplifying the AC component of the output signal from said pressure sensor means and producing an output signal having the same amplitude as said pressure-dependent component,
        inverter means for producing an output signal which is the inverse of the output signal from said amplifier means, and
        second waveform shaping means for summing the output signal from said low-pass filter means and the output signal from said inverter means; and
    filter means for removing the AC component from the output signal of said pressure sensor and producing a DC output signal which is proportional to the average air pressure within said main intake air passage.

2. An air intake meter as claimed in claim 1, further comprising a first series RC circuit which is connected between the output side of said low pass filter means and the input side of said second waveform shaping means, and a second series RC circuit which is connected between the output side of said inverter means and the input side of said second waveform shaping means.

3. An air intake meter as claimed in claim 1, wherein said pressure sensor means is disposed so as to measure the air pressure within said main air intake passageway.

4. An air intake meter as claimed in claim 3, wherein said pressure sensor means is disposed so as to measure the air pressure upstream of said Karman vortex shedder.

5. An air intake meter as claimed in claim 3, wherein said pressure sensor means is disposed so as to measure the air pressure downstream of said Karman vortex shedder.

* * * * *